US009386466B2

(12) United States Patent
Höglund et al.

(10) Patent No.: US 9,386,466 B2
(45) Date of Patent: Jul. 5, 2016

(54) MOBILE DEVICE, NETWORK NODE AND METHODS OF OPERATING THE SAME IN A MOBILE COMMUNICATIONS NETWORK

(71) Applicant: Telefonaktiebolaget L M Ericsson (publ), Stockholm (SE)

(72) Inventors: Andreas Höglund, Solna (SE); Stephen Grant, Pleasanton, CA (US); Edgar Ramos, Espoo (FI); Yi-Pin Eric Wang, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/419,294

(22) PCT Filed: Oct. 17, 2012

(86) PCT No.: PCT/SE2012/051113
§ 371 (c)(1),
(2) Date: Feb. 3, 2015

(87) PCT Pub. No.: WO2014/021750
PCT Pub. Date: Feb. 6, 2014

(65) Prior Publication Data
US 2015/0189519 A1 Jul. 2, 2015

Related U.S. Application Data

(60) Provisional application No. 61/679,219, filed on Aug. 3, 2012.

(51) Int. Cl.
*H04W 24/02* (2009.01)
*H04W 52/32* (2009.01)
(Continued)

(52) U.S. Cl.
CPC ............. *H04W 24/02* (2013.01); *H04B 17/27* (2015.01); *H04B 17/327* (2015.01); *H04W 16/08* (2013.01);
(Continued)

(58) Field of Classification Search
CPC ............ H04W 72/042; H04W 72/048; H04W 72/1273; H04W 72/085; H04W 72/1257; H04W 36/0072; H04W 16/32
See application file for complete search history.

(56) References Cited

U.S. PATENT DOCUMENTS

2007/0008929 A1 * 1/2007 Lee ........................ H04W 36/26 370/331
2009/0003272 A1 1/2009 Payne et al.
(Continued)

FOREIGN PATENT DOCUMENTS

EP 2 387 279 11/2011
GB 2494754 3/2013

OTHER PUBLICATIONS

3GPP TS 25.331 V10.16.0 (Jun. 2014) 3rd Generation Partnership Project; Technical Specification Group Radio Access Network; Radio Resource Control (RRC); Protocol specification (Release 10) (note: Due to size, this reference has been split into 10 separate documents).

(Continued)

*Primary Examiner* — Nizar Sivji
(74) *Attorney, Agent, or Firm* — Baker Botts, LLP

(57) ABSTRACT

There is provided a method of operating a mobile device in a heterogeneous communications network, the heterogeneous communications network comprising first and second base stations, the first base station having a lower transmission power than the second base station and being within the coverage area of the second base station, the method comprising obtaining measurements of the quality of signals transmitted between the first base station and the mobile device and/or the second base station and the mobile device; and analyzing the measurements of the quality to determine whether the mobile device is located in an imbalanced region or part of an imbalanced region between the first and second base stations.

17 Claims, 6 Drawing Sheets

(51) Int. Cl.
*H04W 16/08* (2009.01)
*H04B 17/27* (2015.01)
*H04B 17/327* (2015.01)
*H04W 52/24* (2009.01)
*H04W 24/08* (2009.01)

(52) U.S. Cl.
CPC ............ *H04W 52/325* (2013.01); *H04W 24/08* (2013.01); *H04W 52/244* (2013.01); *Y02B 60/50* (2013.01)

(56) References Cited

U.S. PATENT DOCUMENTS

| | | | | |
|---|---|---|---|---|
| 2009/0196245 A1* | 8/2009 | Ji | ................. | H04L 1/0025 370/329 |
| 2010/0008230 A1* | 1/2010 | Khandekar | ........... | H04W 16/10 370/237 |
| 2010/0238884 A1* | 9/2010 | Borran | ................. | H04W 16/10 370/329 |
| 2011/0269442 A1* | 11/2011 | Han | .................... | H04W 72/082 455/418 |
| 2011/0294499 A1 | 12/2011 | Vikberg et al. | | |
| 2011/0312319 A1* | 12/2011 | Lindoff | ............... | H04W 72/042 455/423 |
| 2012/0157108 A1 | 6/2012 | Boudreau et al. | | |
| 2012/0165029 A1* | 6/2012 | Lindbom | ................. | H04L 5/00 455/450 |
| 2012/0258724 A1* | 10/2012 | Kim | .................... | H04W 72/082 455/452.2 |
| 2013/0210431 A1* | 8/2013 | Abe | .................... | H04W 52/244 455/435.1 |

OTHER PUBLICATIONS

International Search Report for International application No. PCT/SE2012/051113 Dec. 3, 2013.
Supplemental European Search Report for Application No./Patent No. 12882459.6-1855 ; 2880930, Dec. 23, 2015.

* cited by examiner

MOBILE DEVICE, NETWORK NODE AND METHODS OF OPERATING THE SAME IN A MOBILE COMMUNICATIONS NETWORK

PRIORITY

This nonprovisional application is a U.S. National Stage Filing under 35 U.S.C. §371 of International Patent Application Ser. No. PCT/SE2012/051113, filed Oct. 17, 2012 and entitled, "A Mobile Device, Network Node and Methods of Operating the Same in a Mobile Communications Network", which claims the benefit, under 35 U.S. C. §119(e), of U.S. Provisional Patent Application Ser. No. 61/679,219, filed Aug. 3, 2012.

TECHNICAL FIELD

The invention relates to a mobile communications network, and in particular relates to methods for determining when a mobile device is located within an imbalanced region (or a part of an imbalanced region) between two base stations in a network, and to mobile devices and network nodes implementing those methods.

BACKGROUND

Heterogeneous networks are an efficient network deployment solution for satisfying the ever-increasing demand of mobile broadband services. In a heterogeneous network, a low- or lower-power node (LPN), for example a picocell, microcell or femtocell base station, is placed in a traffic hot spot within the coverage area of a high- or higher-power node, for example a macrocell base station, to better serve nearby mobile devices. Deploying a low power node in a traffic hot spot may significantly reduce the load in the macro or other higher-power cell covering the area.

The traffic uptake of an LPN however may be somewhat limited. This is due to the transmit power difference between a macro base station (BS) and an LPN. This is illustrated in FIG. 1. In FIG. 1, the network 2 is shown as comprising a low power node 4 (e.g. picocell or microcell base station) placed within the coverage area of a macrocell base station 6. Each of the LPN 4 and macrocell base station 6 are connected to a radio network controller (RNC) 8, which in turn connects to a core network 10. As downlink signal strength or quality is used as a basis for triggering a hand over between base stations, the border 12 of the LPN cell is determined by the downlink (DL) signal strength or quality as measured by a mobile communications device 12 (also known as a user equipment—UE). The border 12 occurs at the point where the downlink signal strength or quality from the LPN 4 is the same as the downlink signal strength or quality from the macrocell base station 6. As the LPN 4 has a much lower transmit power level compared to the macrocell base station 6, the cell border 12 is much closer to the LPN 4 than the macrocell base station 6. However from the uplink (UL) perspective, the base station transmit power difference is irrelevant and the UE 14 would be best served by the base station to which it has the lowest path loss. Thus, for the UL, the cell border should be somewhere near the equal-distance point between the two base stations 4, 6 since at the equal-distance points the path loss from the UE 14 to both base stations 4, 6 is approximately equal.

The region 16 between the UL 'border' and DL border 12 is often referred to as the imbalanced region 16. In the imbalanced region, the UL from the UE 14 would generally be better served by the low-power node 4 (as it is closer to the UE 14 than the macrocell base station 6), but the DL would be better served by the macrocell base station 6. However, as cell selection is determined on the basis of the DL signal quality, a UE 14 in the imbalanced region 16 will generally be served by the macrocell base station 6, meaning that the UE 14 cannot take advantage of the better UL to the LPN 4.

A further problem with UEs 14 in the imbalanced region 16 is that UL transmissions by a UE 14 to the macrocell base station 6 can cause interference at the LPN 4 (particularly where the UE 14 is close to the DL border 12).

In addition, conventional handover decisions based on DL signal quality may result in the traffic-uptake of the LPN 4 being less than desired by the network operator.

A number of techniques and solutions are available for UEs 14 that can be used to improve the communications performance of UEs 14 that are located in the imbalanced region 16 of a network 2. For example, the range of the LPN 4 can be effectively extended by a UE 14 applying an offset to the measurements of downlink signal quality from the LPN 4, and using the adjusted downlink signal quality measurement in cell selection decisions (which means that the UE 14 can be served by the LPN 4 while it is in at least a portion of the imbalanced region 16). In another example, a form of soft handover can be used in which the macrocell base station 6 remains as the serving cell for the UE 14 when it is in the imbalanced region 16, but the UE 14 establishes a data connection with both the macrocell base station 6 and the LPN 4. Other techniques and solutions will be apparent to those skilled in the art.

Although many of these techniques or solutions are successful in improving the performance of the UE 14 in the imbalanced region 16, they require actions by the nodes 4, 6, 8 in the network 2 and/or additional signalling to be established with the UE 14, which consumes resources in the network 2. Thus, these techniques and solutions should only be initiated and used when they are needed or likely to be beneficial to the UE 14 (i.e. when the UE 14 is within the imbalanced region 16).

SUMMARY

Therefore, there is a need for methods for determining when a UE 14 is located within the imbalanced region 16 (or a part of the imbalanced region 16) between two base stations 4, 6 in a network 2 and mobile devices and network nodes configured to implement those methods.

According to a first aspect, there is provided a method of operating a mobile device in a heterogeneous communications network, the heterogeneous communications network comprising first and second base stations, the first base station having a lower transmission power than the second base station and being within the coverage area of the second base station, the method comprising obtaining measurements of the quality of signals transmitted between the first base station and the mobile device and/or the second base station and the mobile device; and analysing the measurements of the quality to determine whether the mobile device is located in an imbalanced region or part of an imbalanced region between the first and second base stations.

If following a determination that the mobile device is not located in the imbalanced region or the part of the imbalanced region, the mobile device is subsequently determined to be located in the imbalanced region or the part of the imbalanced region, the method can further comprise the step of transmitting a signal from the mobile device to at least one of the first and second base stations indicating that the mobile device has entered the imbalanced region or the part of the imbalanced region.

If following a determination that the mobile device is located in the imbalanced region or the part of the imbalanced region, the mobile device is subsequently determined not to be located in the imbalanced region or the part of the imbalanced region, the method can further comprise the step of transmitting a signal from the mobile device to at least one of the first and second base stations indicating that the mobile device is no longer in the imbalanced region or the part of the imbalanced region.

In the event that it is determined in the step of analysing that the mobile device is located in the imbalanced region or the part of the imbalanced region and data is to be transmitted by the mobile device, the method can alternatively or additionally comprise the step of transmitting a signal from the mobile device to at least one of the first and second base stations indicating that the mobile device is located in the imbalanced region or the part of the imbalanced region.

In some embodiments, the signal transmitted by the mobile device to at least one of the first and second base stations comprises a message indicating whether the mobile device is located in an imbalanced region or part of an imbalanced region between the first and second base stations.

In other embodiments, the signal transmitted by the mobile device to at least one of the first and second base stations is a measurement report that comprises the obtained measurements of the quality of signals transmitted between the first base station and the mobile device and the second base station and the mobile device.

In some implementations, the step of obtaining comprises measuring the quality of downlink signals from the first and second base stations to the mobile device, and wherein the step of analysing comprises determining whether the mobile device is located in an imbalanced region where (i) the measured quality of downlink signals from the second base station is equal to or greater than the measured quality of downlink signals from the first base station, and (ii) the difference between the measured quality of downlink signals from the second base station and the measured quality of downlink signals from the first base station is equal to or less than the difference in the power at which the first and second base stations transmit signals in a control channel.

Alternatively, the step of obtaining can comprise measuring the quality of downlink signals from the first and second base stations to the mobile device and determining a pathgain from the mobile device to each base station, and wherein the step of analysing comprises determining whether the mobile device is located in an imbalanced region where (i) the determined pathgain of uplink signals from the mobile device to the first base station is equal to or greater than the determined pathgain of uplink signals from the mobile device to the second base station, and (ii) the difference between the determined pathgain of uplink signals to the first base station and the determined pathgain of uplink signals to the second base station is equal to or less than the difference between the power at which the first and second base stations transmit signals in a control channel.

In either of the two alternatives above, the mobile device can determine the power at which the first and second base stations transmit signals in a control channel by reading the broadcast system information from each base station, the broadcast system information indicating the power at which the respective base station transmits its control channel, for example a common pilot channel.

In another alternative, the step of obtaining can comprise measuring the quality of downlink signals from the first and second base stations to the mobile device, and wherein the step of analysing comprises determining whether the mobile device is located in a part of the imbalanced region where (i) the measured quality of downlink signals from the second base station is equal to or greater than the measured quality of downlink signals from the first base station, and (ii) the difference between the measured quality of downlink signals from the second base station and the measured quality of downlink signals from the first base station is equal to or less than an offset value that is used to extend the range of the first base station.

In a yet further alternative, the step of obtaining comprises measuring the quality of downlink signals from the first and second base stations to the mobile device and determining a pathgain from the mobile device to each base station, and wherein the step of analysing comprises determining whether the mobile device is located in a part of the imbalanced region where (i) the difference between the determined pathgain of uplink signals from the mobile device to the first base station and the determined pathgain of uplink signals from the mobile device to the second base station is equal to or less than the difference between the power at which the first and second base stations transmit signals in a control channel, and (ii) the difference between the determined pathgain of uplink signals to the first base station and the determined pathgain of uplink signals to the second base station is equal to or greater than an offset value that is used to extend the range of the first base station.

In these latter two alternatives, the method can further comprise the step of determining the offset value from signals received in a control channel from the first and/or second base stations.

In a further alternative implementation, the step of obtaining comprises measuring the quality of downlink signals from the first base station to the mobile device and the step of analysing comprises comparing the measured quality to upper and lower thresholds and determining that the mobile device is located in a part of the imbalanced region if the measured quality is below the upper threshold and above the lower threshold.

Preferably, the imbalanced region is defined as the region where (i) the quality of downlink signals from the second base station is equal to or greater than the quality of downlink signals from the first base station, and (ii) the quality of uplink signals from the mobile device at the first base station is equal to or greater than the quality of uplink signals from the mobile device at the second base station.

According to a second aspect, there is provided a computer program product, comprising computer-readable code embodied therein, the computer-readable code being configured such that, on execution by a suitable computer or processor, the computer or processor is configured to perform any of the methods defined above.

According to a third aspect, there is provided a mobile device for use in a heterogeneous communications network, the heterogeneous communications network comprising first and second base stations, the first base station having a lower transmission power than the second base station and being within the coverage area of the second base station, the mobile device comprising a processing module configured to obtain measurements of the quality of signals transmitted between the first base station and the mobile device and/or the second base station and the mobile device and to analyse the measurements of the quality to determine whether the mobile device is located in an imbalanced region or part of an imbalanced region between the first and second base stations.

Various embodiments of the mobile device are also provided that have a processing module configured to perform the steps contained in the above-defined methods.

According to a fourth aspect, there is provided a method of operating a node in a heterogeneous communications network, the heterogeneous communications network comprising first and second base stations, the first base station having a lower transmission power than the second base station and being within the coverage area of the second base station, the method comprising receiving a signal from a mobile device in the network; and analysing the received signal to determine whether the mobile device is located in an imbalanced region or part of an imbalanced region between the first and second base stations.

In some embodiments, the signal indicates one of (i) the mobile device has entered the imbalanced region or the part of the imbalanced region; (ii) the mobile device is no longer located in the imbalanced region or the part of the imbalanced region; or (iii) the mobile device is located in the imbalanced region or the part of the imbalanced region.

In particular embodiments, the received signal can comprise a message that indicates measurements of the quality of signals transmitted between the first base station and the mobile device and/or the second base station and the mobile device; and wherein the step of analysing comprises analysing the measurements to determine whether the mobile device is located in the imbalanced region or the part of the imbalanced region between the first and second base stations.

In some implementations, where the measurements of the quality of signals are measurements of the quality of downlink signals from the first and second base stations to the mobile device, the step of analysing can comprise determining whether the mobile device is located in an imbalanced region where (i) the measured quality of downlink signals from the second base station is equal to or greater than the measured quality of downlink signals from the first base station, and (ii) the difference between the measured quality of downlink signals from the second base station and the measured quality of downlink signals from the first base station is equal to or less than the difference in the power at which the first and second base stations transmit signals in a control channel.

In alternative implementations, where the measurements of the quality of signals are measurements of the quality of downlink signals from the first and second base stations to the mobile device or measurements of the pathgain from the mobile device to each base station derived from the measurements of the quality of the downlink signals, the step of analysing can comprise determining whether the mobile device is located in an imbalanced region where (i) the pathgain of uplink signals from the mobile device to the first base station is equal to or greater than the pathgain of uplink signals from the mobile device to the second base station, and (ii) the difference between the pathgain of uplink signals to the first base station and the pathgain of uplink signals to the second base station is equal to or less than the difference between the downlink transmission powers for the first and second base stations.

In other alternative implementations, where the measurements of the quality of signals are measurements of the quality of downlink signals from the first and second base stations to the mobile device, the step of analysing can comprise determining whether the mobile device is located in a part of the imbalanced region where (i) the measured quality of downlink signals from the second base station is equal to or greater than the measured quality of downlink signals from the first base station, and (ii) the difference between the measured quality of downlink signals from the second base station and the measured quality of downlink signals from the first base station is equal to or less than an offset value that is used to extend the range of the first base station.

In yet further alternative implementations, where the measurements of the quality of signals are measurements of the quality of downlink signals from the first and second base stations to the mobile device or measurements of the pathgain from the mobile device to each base station derived from the measurements of the quality of the downlink signals, the step of analysing can comprise determining whether the mobile device is located in a part of the imbalanced region where (i) the difference between the pathgain of uplink signals from the mobile device to the first base station and the pathgain of uplink signals from the mobile device to the second base station is equal to or less than the difference between the power at which the first and second base stations transmit signals in a control channel, and (ii) the difference between the pathgain of uplink signals to the first base station and the pathgain of uplink signals to the second base station is equal to or greater than an offset value that is used to extend the range of the first base station.

In a further alternative, the measurements of the quality of signals are measurements of the quality of downlink signals from the first base station to the mobile device and the step of analysing comprises comparing the measured quality to upper and lower thresholds, and determining that the mobile device is located in a part of the imbalanced region if the measured quality is below the upper threshold and above the lower threshold.

The imbalanced region can be defined as the region where (i) the quality of downlink signals from the second base station exceeds the quality of downlink signals from the first base station, and (ii) the quality of uplink signals from the mobile device at the first base station exceeds the quality of uplink signals from the mobile device at the second base station.

In alternative embodiments, where the signal is a signal sent in an uplink channel from the mobile device to one of the first and second base stations, the method can further comprise the steps of determining the quality of the uplink channel from the mobile device to the one of the first and second base stations from the received signal; and receiving a signal from the other one of said first and second base stations, the signal indicating the quality of the uplink channel from the mobile device to the other one of said first and second base stations; and wherein the step of analysing comprises analysing the quality of the uplink channels from the mobile device to the first and second base stations to determine whether the mobile device is located in an imbalanced region or part of an imbalanced region between the first and second base stations.

In these embodiments, the step of analysing can comprise determining whether the mobile device is located in an imbalanced region where (i) the quality of uplink signals from the mobile device to the first base station is equal to or greater than the quality of uplink signals from the mobile device to the second base station, and (ii) the difference between the quality of uplink signals to the first base station and the quality of uplink signals to the second base station is equal to or less than the difference between the power at which the first and second base stations transmit signals in a control channel.

Alternatively, the step of analysing can comprise determining whether the mobile device is located in a part of the imbalanced region where (i) the difference between the quality of uplink signals from the mobile device to the first base station and the quality of uplink signals from the mobile device to the second base station is equal to or less than the difference between the power at which the first and second base stations transmit signals in a control channel, and (ii) the difference between the quality of uplink signals to the first base station and the quality of uplink signals to the second base station is equal to or greater than an offset value that is used to extend the range of the first base station.

In further alternative embodiments, where the signal is a signal sent in an uplink channel from the mobile device to one of the first and second base stations that is the base station serving the mobile device, the method can further comprise the steps of determining the time of receipt of the signal in the uplink channel at the one of the first and second base stations that is the base station serving the mobile device; and receiving a signal from the other one of said first and second base stations, the signal indicating the time of receipt of the signal in the uplink channel at the other one of said first and second base stations; and wherein the step of analysing comprises comparing the determined time of receipt and the received time of receipt to determine whether the mobile device is located in an imbalanced region between the first and second base stations.

In this alternative embodiment, the step of analysing can comprise determining that the mobile device is located in the imbalanced region when the mobile device is being served by the second base station and the time of receipt of the signal in the uplink channel at the first base station is before the time of receipt of the signal in the uplink channel at the second base station.

In any of the above embodiments, if it is determined in the step of analysing that the mobile device has entered or is located in the imbalanced region or the part of the imbalanced region, the method can further comprise the step of initiating an action to improve the communication performance of the mobile device with the network.

In any of the above embodiments, if it is determined in the step of analysing that the mobile device is located in the imbalanced region or the part of the imbalanced region and data is to be transmitted by the mobile device, the method can further comprise the step of initiating an action to improve the communication performance of the mobile device with the network.

In any of the above embodiments, the node can be one of the first base station, second base station or a radio network controller associated with one or both of the first base station and the second base station.

According to a fifth aspect, there is provided a computer program product comprising computer readable code embodied therein, the computer readable code being configured such that, on execution by a suitable computer or processor, the computer or processor is configured to perform the method described above with respect to the network node.

According to a sixth aspect, there is provided a node for use in a heterogeneous communications network, the heterogeneous communications network comprising first and second base stations, the first base station having a lower transmission power than the second base station and being within the coverage area of the second base station, the node comprising a transceiver module configured to receive a signal from a mobile device in the network; and a processing module configured to analyse the received signal to determine whether the mobile device is located in an imbalanced region or part of an imbalanced region between the first and second base stations.

Various embodiments of the node are provided that have a processing module configured to perform the steps contained in the above-defined methods of operating a node. In particular embodiments, the node may be one of the first base station, second base station or a radio network controller associated with one or both of the first base station and the second base station.

BRIEF DESCRIPTION OF THE DRAWINGS

Embodiments will now be described, by way of example only, with reference to the following drawings, in which.

DETAILED DESCRIPTION

Although embodiments described below refer to a UMTS mobile communications network, it will be appreciated that the teachings of this application are applicable to other types of network in which nodes of differing transmit power can be deployed.

In addition, although the embodiments described below refer to a picocell base station within the coverage area of a macrocell base station, it will be appreciated that the teachings of this application are applicable to any type of heterogeneous deployment of nodes (e.g. a picocell base station within the coverage area of a microcell base station, a microcell base station within the coverage area of a macrocell base station, or a femtocell base station within the coverage area of any of a picocell, microcell or macrocell base station).

As indicated above, there are various solutions available for optimising or improving the performance of UEs 14 when they are in an imbalanced region 16 between a low-power node 4 (such as a picocell base station, microcell base station or a femtocell base station) and a higher-power node 6, such as a macrocell base station. However, these solutions are often provided at the expense of increased resource consumption in the nodes of the network 2. The methods described herein provide a way to determine when it is appropriate to activate these solutions for a particular UE 14. In other words, the methods provide a way of determining when the UE 14 is in the imbalanced region, or, in some embodiments, when the UE 14 is in part of the imbalanced region up to the end of a 'range extension' region (as set by an offset value that is applied to the signal quality measurements for transmissions between the UE 14 and the LPN 4).

Figure 1:
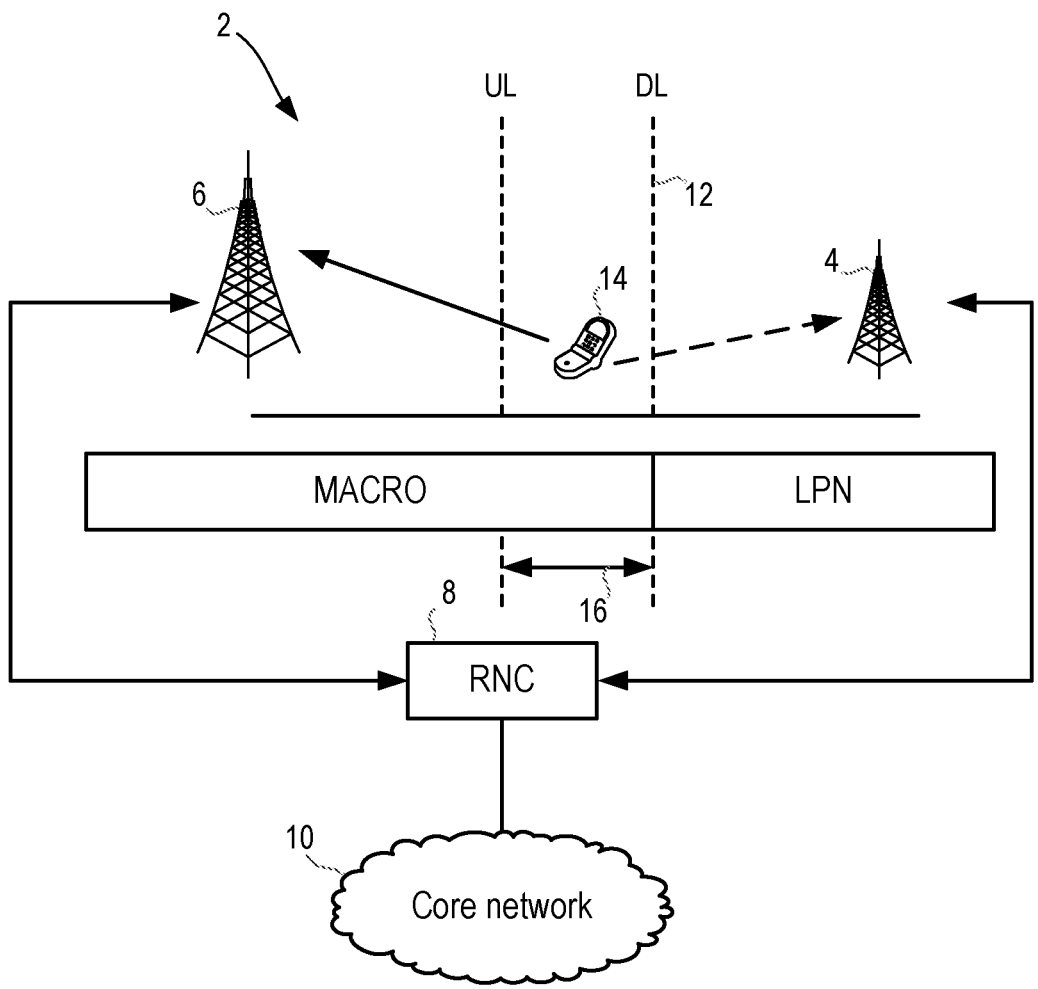
FIG. 1 is an illustration of a network.
Figure 2:
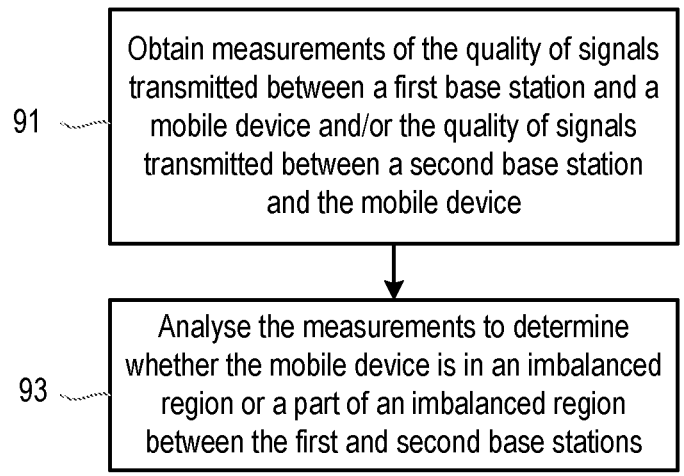
FIG. 2 is a flow chart illustrating a method in a user equipment.

The flow chart of FIG. 2 shows an exemplary method of operating a mobile device (UE) 14 in a heterogeneous network 2. In a first step, step 91, measurements of the quality of signals transmitted between a first base station (e.g. picocell base station 4) and the mobile device 14 and/or a second base station (e.g. macrocell base station 6) and the mobile device 14 are obtained. Then, in step 93, these measurements are analysed to determine whether the mobile device 14 is in an imbalanced region 16 or part of an imbalanced region 16 between the first and second base stations 4, 6.

Figure 3:
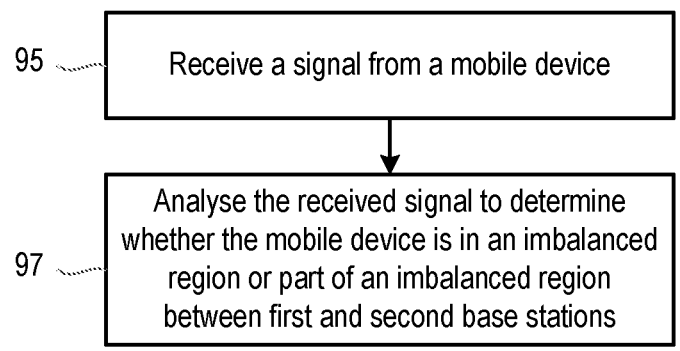
FIG. 3 is a flow chart illustrating a method in a network node.

The flow chart of FIG. 3 shows an exemplary method of operating a node in the network 2, such as picocell base station 4, macrocell base station 6 and/or RNC 8. In a first step, step 95, a signal is received from a mobile device 14. This signal is analysed in step 97 to determine whether the mobile device 14 is in an imbalanced region 16 or part of an imbalanced region 16 between first and second base stations 4, 6.

Since additional overhead (e.g. signalling) in terms of the sending of measurement reports from the UE 14 should be minimised, the UE 14 ideally should not continuously inform the network 2 of the experienced quality of its measured cells or of its position in relation to an imbalanced region 16. Hence, in a first specific embodiment, described with reference to FIG. 7 below, UEs 14 are configured to notify the network 2 when they have entered or left the imbalanced region 16 or the specified part of the imbalanced region 16 (i.e. the range extension region). In this embodiment, the network 2 will have full awareness of which UEs 14 are located in an imbalanced region 16 or range extension region and therefore which UEs 14 could gain from appropriate solutions for managing heterogeneous networks. In a second specific embodiment, described with reference to FIG. 8 below, UEs 14 are configured to inform the network 2 of their location with respect to an imbalanced region 16 or part of the imbalanced region 16 at the start of a data transmission. In this embodiment, the amount of additional signalling is minimised since UEs 14 only transmit a measurement report or location indicator when there is data to be transmitted.

Figure 4:
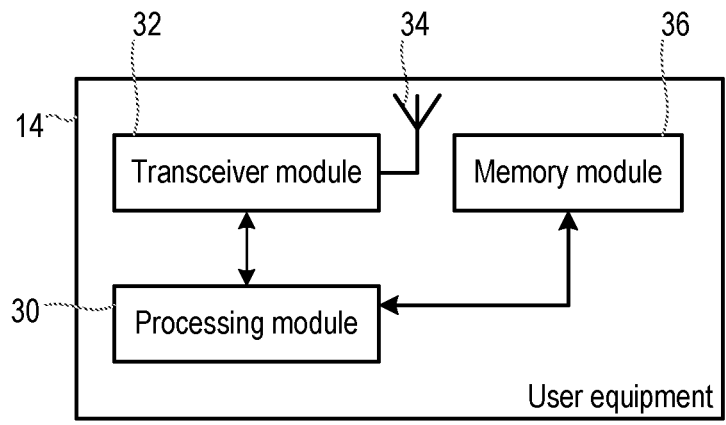
FIG. 4 is a block diagram of a user equipment.

FIG. 4 shows a UE 14 that can be used in one or more of the embodiments described below. The UE 14 comprises a processing module 30 that controls the operation of the UE 14. The processing module 30 is connected to a receiver or transceiver module 32 with associated antenna(s) 34 which are used to receive signals from a base station 4, 6 in the network 2. The user equipment 14 also comprises a memory module 36 that is connected to the processing module 30 and that stores information and data required for the operation of the UE 14, including data received from the network 2.

Figure 5:
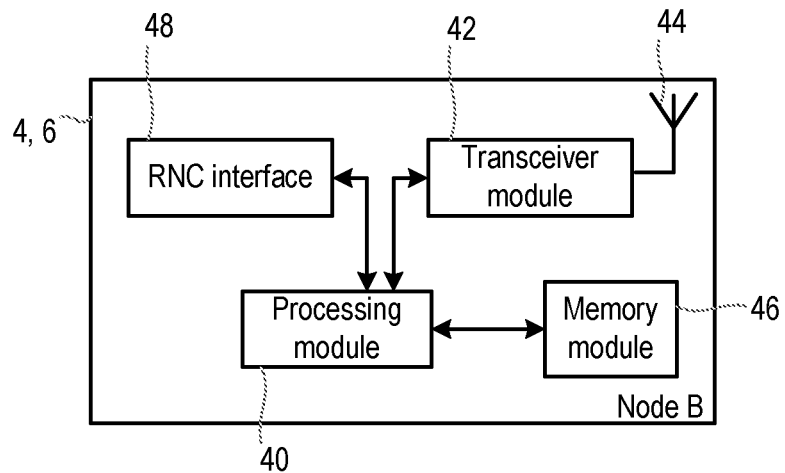
FIG. 5 is a block diagram of a base station.

FIG. 5 shows a base station 4, 6 (called a Node B in UMTS) that can be used in one or more of the embodiments described below. Although in practice the picocell base station 4 will not be identical in size and structure to the macrocell base station 6, for the purposes of this description, the base stations 4, 6 are considered to comprise the same components. Thus, the base station 4, 6 comprises a processing module 40 that controls the operation of the base station 4, 6. The processing module 40 is connected to a transceiver module 42 with associated antenna(s) 44 which are used to transmit signals to, and receive signals from, user equipments 14 in the network 2. The base station 4, 6 also comprises a memory module 46 that is connected to the processing module 40 and that stores information and data required for the operation of the base station 4, 6. The base station 4, 6 also includes components and/or circuitry 48 for allowing the base station 4, 6 to exchange information with the RNC 8 (which is typically via the Iub interface).

Figure 6:
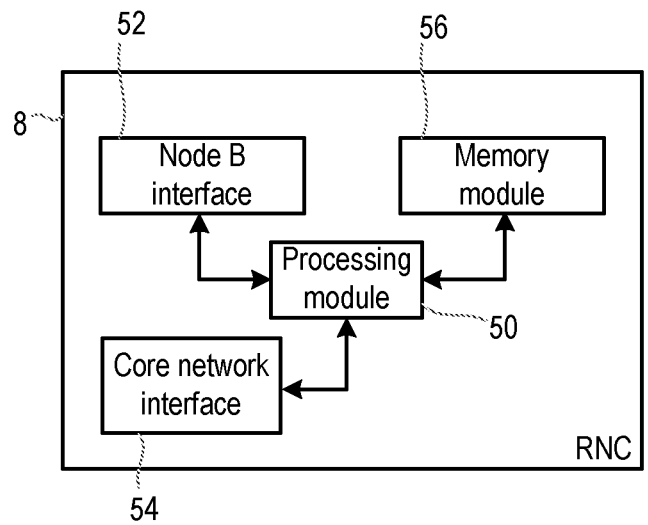
FIG. 6 is a block diagram of a radio network controller.

FIG. 6 shows a radio network controller (RNC) 8 that can be used in one or more of the embodiments described below. The RNC 8 comprises a processing module 50 that controls the operation of the RNC 8. The processing module 50 is connected to components and/or circuitry 52 for allowing the RNC 8 to exchange information with the base stations 4, 6 with which it is associated (which is typically via the Iub interface), and components or circuitry 54 for allowing the RNC 8 to exchange information with the core network 10 (which is typically via the Iu-CS and/or Iu-PS interface). The RNC 8 also comprises a memory module 56 that is connected to the processing module 50 and that stores information and data required for the operation of the RNC 8.

It will be appreciated that, for simplicity, only components of the UE 14, Node B 4, 6 and RNC 8 required to illustrate the methods described below are shown in FIGS. 4, 5 and 6.

Figure 7:
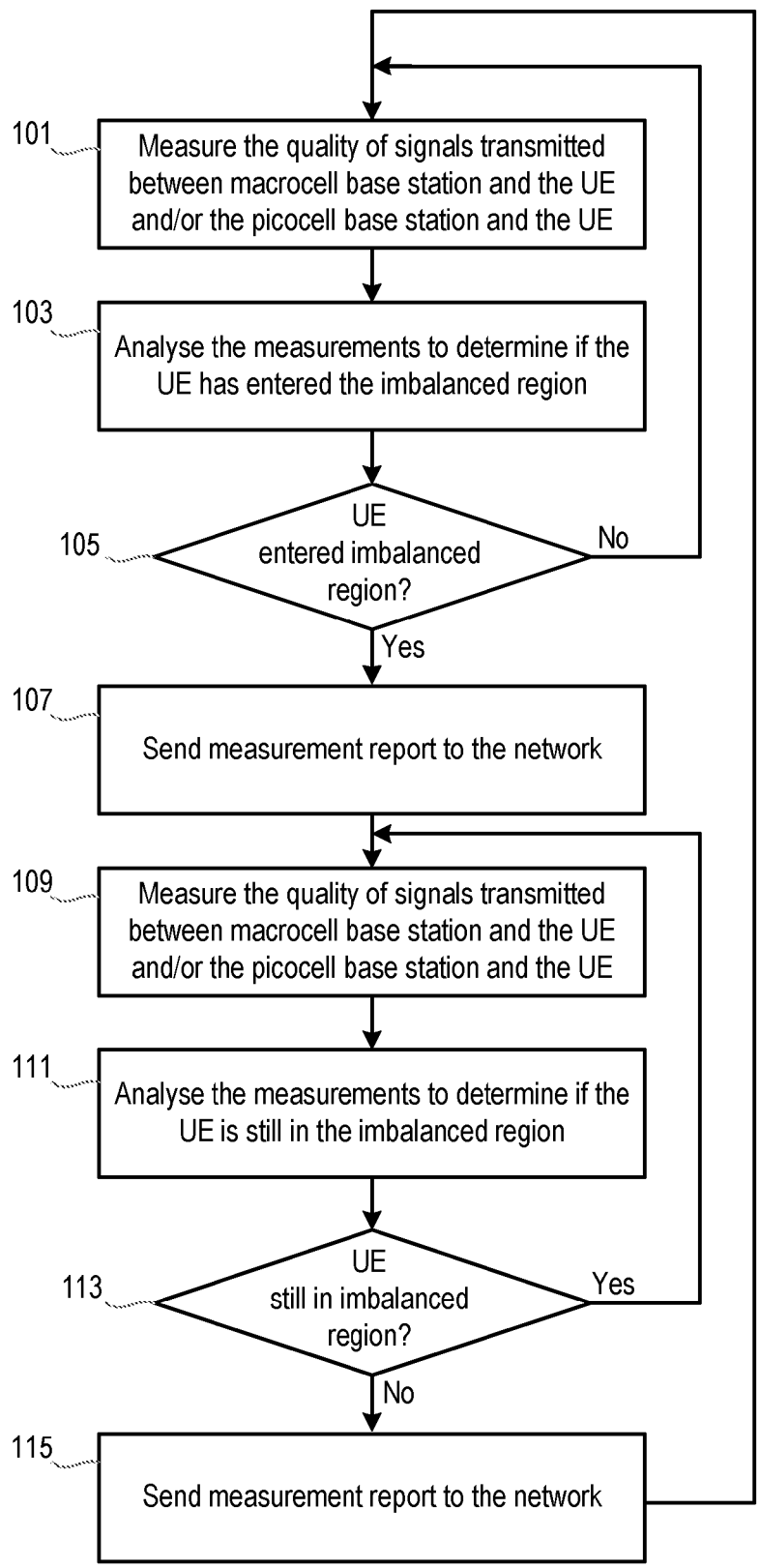
FIG. 7 is a flow chart illustrating a method of operating a user equipment according to a first specific embodiment.

A method of operating a UE 14 according to a first embodiment is shown in FIG. 7. In step 101, the UE 14 measures the quality of signals transmitted between the UE 14 and nearby base stations 4, 6. For the purposes of this method, it is assumed that the UE 14 measures the quality of signals transmitted between the UE 14 and at least one of a picocell base station 4 and an overlying macrocell base station 6. It is also assumed at step 101 that the UE 14 is not yet in the imbalanced region 16. If the UE 14 is already in the imbalanced region 16, the method can alternatively commence at step 109.

In step 101 the UE 14 preferably measures the quality of downlink signals from at least one of the picocell base station 4 and the macrocell base station 6. The signals are received by the antenna(s) 34 and receiver module 32 in the UE 14 and passed to the processing module 30 for the processing module 30 to determine the quality measurements.

The downlink signals received by the UE 14 can be the common pilot channel (CPICH), and the quality measurement can be the CPICH received signal code power (RSCP) and/or the CPICH. $E_c/N_o$ (which is the ratio of the received energy per pseudorandom noise (PN) chip for the CPICH to the total received power spectral density at the UE 14).

Then, in step 103, the UE 14 analyses the measurements to determine if the UE 14 has entered the imbalanced region 16. As described above, the imbalanced region 16 is the region in a heterogeneous network deployment between a higher-power node 6 and a lower-power node 4 where, for a UE 14 in this region 16, the higher-power node 6 is the strongest or best cell for the DL to the UE 14, but the lower-power node 4 is the strongest or best cell for the UL from the UE 14.

Since it can be difficult for a UE 14 to determine and keep track of the best cell for the UL from the UE 14, it is preferable for the UE 14 to determine whether it is in the imbalanced region 16 based on measurements of DL quality only. In some embodiments, the imbalanced region 16 can be defined as any location x where the following relationship is satisfied:

$$x: 0 \leq F_{macro}(x) - F_{pico}(x) \leq P_{diff} \quad (1)$$

where the function F represents the DL quality measurement at location x from a particular cell (either in terms of RSCP or $E_C/N_o$ in dB with regards to the CPICH), and $P_{diff}$ is the difference (in dB) in the transmission power of the macrocell base station 6 CPICH and the picocell base station 4 CPICH. The location x where $F_{macro}(x)-F_{pico}(x)=0$ corresponds to the DL border 12, and the location x where $F_{macro}(x)-F_{pico}(x)=P_{diff}$ corresponds to the UL border. In some implementations, if the DL quality measurement F is based on CPICH $E_c/N_o$, the threshold for the UL border can be set as $P_{diff}+\Delta$, where $\Delta$ can be a small positive or negative number and is used to account for the difference in total interference levels experienced by the picocell CPICH versus the macrocell CPICH. The value for $\Delta$ may be predetermined.

$P_{diff}$ is straight forward to calculate in the UE 14 since the primary CPICH transmission power for each of the base stations 4, 6 is communicated to the UE 14 via one of the broadcast system information messages. The original purpose of this signalling is so that the UE 14 can estimate the pathloss from each of the base stations 4, 6 which enables the UE to perform random access. The transmission of information on the primary CPICH transmission power is detailed in section 10.3.6.61 of 3 GPP specification 25.331, v10.8, June 2012.

Where the UE 14 is to determine whether it is in a part of the imbalanced region 16, such as a part extending from the DL border 12 up to the end of a range extension region, the UE 14 can use the following relationship in step 103:

$$x: 0 \leq F_{macro}(x) - F_{pico}(x) \leq RE \tag{2}$$

where RE is the amount of offset to be applied to quality measurements of the DL signals from the picocell base station 4. Typically, the range extension region forms a subset of the full imbalanced region 16 (i.e. $RE \leq P_{diff}$). In this case, the picocell range can be expanded all the way up to the UL border. However, in some cases, expanding the picocell range beyond the imbalanced region 16 can be desirable, i.e. $RE > P_{diff}$.

The amount of range extension to be applied to a particular low-power cell (i.e. the value of RE) is communicated to the UE 14 so that it can be used in cell selection/reselection decisions (when the UE 14 is in a CELL_FACH state) or in triggering the issue of a measurement report to the network 2 (when the UE 14 is in a CELL_DCH state). In CELL_DCH, the hand over is event triggered by the UE 14 (event 1d in section 10.3.7.39 in 3GPP specification 25.331, v10.8, June 2012). and the UE 14 must therefore be aware of any bias or offset used for the cell reselection, typically denoted the Cell Individual Offset (CIO). In CELL_FACH the hand over is UE centred and therefore the UE 14 must know any bias or offset, typically denoted qOffset1sn or qOffset2sn, for the camping cell reselection. Thus, the UE 14 will be aware of the value of RE when step 103 is to be performed.

However, in both cases above (i.e. when using relationship (1) or (2)), any offsets such as the CIO for CELL_DCH or qOffset1/2sn for CELL_FACH will typically not be included in the calculation of F. It is, for example, desirable for the UE 14 to inform the network 2 when the UE 14 is at the DL border 12 even when offsets are used to achieve range extension for the picocell 4.

As an alternative to the definitions provided in equations (1) and (2) above, the imbalanced region 16 can be defined in terms of the pathgain on the UL from the UE 14 to the picocell base station 4 and the macrocell base station 6. In this case, the imbalanced region 16 can be defined as any location x where the following relationship is satisfied $$x: 0 \leq G_{pico}(x) - G_{macro}(x) \leq P_{diff} \tag{3}$$

where the function G represents the pathgain at location x for a particular cell in dB, and $P_{diff}$ is the difference in the CPICH transmission power of the macrocell base station 6 and the picocell base station 4. The pathgain G on the UL is the inverse of the DL pathloss from a base station 4, 6 to the UE 14, and so the pathgain G can be calculated by the UE 14 as the measured DL CPICH RSCP for a cell divided by the CPICH transmission power for that cell. The location x where $G_{pico}(x) - G_{macro}(x) = 0$ corresponds to the UL border, and the location x where $G_{pico}(x) - G_{macro}(x) = P_{diff}$ corresponds to the DL border 12.

Similarly, an alternative relationship that can be used to determine if the UE 14 is in the range extension region is:

$$x: RE \leq G_{pico}(x) - G_{macro}(x) \leq P_{diff} \tag{4}$$

where RE is the amount of offset to be applied to quality measurements of the DL signals from the picocell base station 4.

It will be appreciated from the above that the imbalanced region 16 can alternatively be defined using a combination of DL signal quality F and the pathgain G (for example the imbalanced region 16 could correspond to any location x where x: $0 < F_{macro}(x) - F_{pico}(x) < P_{diff}$ and $0 < G_{pico}(x) - G_{macro}(X) < P_{diff}$).

In another alternative, where the UE 14 only measures the signal quality (preferably the RSCP) of the CPICH from the picocell base station 4, the imbalanced region 16 or the range extension region can correspond to a location x where:

$$x: a \leq F_{pico}(x) \leq b \tag{5}$$

with a being a lower threshold and b being an upper threshold. The values of a and b can be optimised according to the power with which the picocell base station 4 and macrocell base station 6 transmit the CPICH.

For example, a network operator can identify the imbalanced region 16 or the range extension region according to equation (1) or (2) by using a test mobile device to measure the signal quality at a number of locations in the network coverage area. Then, the network operator can obtain the upper bound b and lower bound a on $F_{pico}(x)$ based on the measurement data collected by the test mobile device in the identified imbalanced region 16 or the range extension region. The upper and lower bounds can be stored in the RNC 8 and used to classify whether UE 14 is in the imbalanced region 16 or the range extension region based on the UE's measurement $F_{pico}(x)$. Alternatively, instead of using the lower bound for the value of a and upper bound for the value of b, the mean of the lowest 10-percentile of $F_{pico}(x)$ measurements from the test mobile device in the identified imbalanced region 16 or the range extension region can be used as the value of a and the mean of the highest 10-percentile of $F_{pico}(x)$ measurements from the test mobile device in the identified imbalanced region 16 or the range extension region can be used as the value of b.

After step 103, it is determined in step 105 whether the UE 14 has entered the imbalanced region 16 (or range extension region). In other words, it is determined whether the UE 14 is now in the imbalanced region 16 (or range extension region) whereas previously it was outside the region. If the UE 14 has not entered the region, the method returns to step 101 and repeats.

If it is determined that the UE 14 has entered the imbalanced region 16 (or range extension region), then the method moves to step 107 in which the UE 14 sends a message to the network 2 to inform the network 2 that the UE 14 is now in the region. In some embodiments, this message is a measurement report that contains the signal quality measurements made by the UE 14 on the downlink signals from the picocell base station 4 and/or macrocell base station 6 (and optionally the signal quality measurements of any other nearby cells). In some embodiments, a new event identity (ID) can be defined for the event of the UE 14 entering the imbalanced region 16, and on occurrence of the event the UE 14 can be configured to transmit the required message or measurement report.

As described with reference to FIG. 9 below, a node in the network 2 (for example the picocell base station 4, macrocell base station 6 or RNC 8) can process the signal quality measurements in the measurement report to determine whether the UE 14 is in the imbalanced region 16 or range extension region.

In alternative implementations, the transmission of the message or measurement report itself can indicate to the network 2 that the UE 14 is in the specified region (e.g. the imbalanced region 16 or part of the imbalanced region 16 between the picocell base station 4 and the macrocell base station 6)—i.e. the UE 14 can be configured to only send the message or measurement report when it has entered the imbalanced region 16 or range extension region.

After the transmission of the measurement report or other message to the network 2 in step 107, the method moves to step 109 in which the UE 14 continues to measure the quality of the downlink signals from the picocell base station 4 and macrocell base station 6. These measurements are then analysed in step 111 to determine if the UE 14 is still in the imbalanced region 16. It will be appreciated that the implementation of steps 109 and 111 is similar, if not the same as, steps 101 and 103 described above.

In step 113, it is determined whether the UE 14 is still in the imbalanced region 16 (or range extension region). If the UE 14 is still in the region, the method returns to step 109. If it is determined that the UE 14 is no longer in the region, the method moves to step 115 in which a measurement report or other message is sent to the network 2 by the UE 14 indicating that the UE 14 is no longer in the imbalanced region 16 or range extension region. As in step 107, the measurement report can indicate the signal quality measurements for the nearby cells 4, 6, the measurement report can be a dedicated message that is only sent when the UE 14 has left the region. Once the message or measurement report has been sent to the network 2, the method returns to step 101.

Although this embodiment has the drawback that messages or measurement reports will be transmitted by the UE 14 when there is no data being transmitted by the UE 14 (for example when the UE is in CELL_FACH state or in DTX/DRX in the CELL_DCH state), resulting in some signalling overhead, it provides the advantage that the network 2 (for example the RNC 8) has full knowledge of exactly which and how many UEs 14 are located in the imbalanced region 16 or range extension region at all times. Therefore the lead time required to set up or implement a certain heterogeneous network solution can be minimised, since it can already be in place before any upcoming data transmission. Furthermore, this knowledge enables the network 2 to implement more complex solutions where, for example, the number of UEs 14 in the imbalanced region 16 or range extension region and/or different states of the UEs 14 are taken into account.

Figure 8:
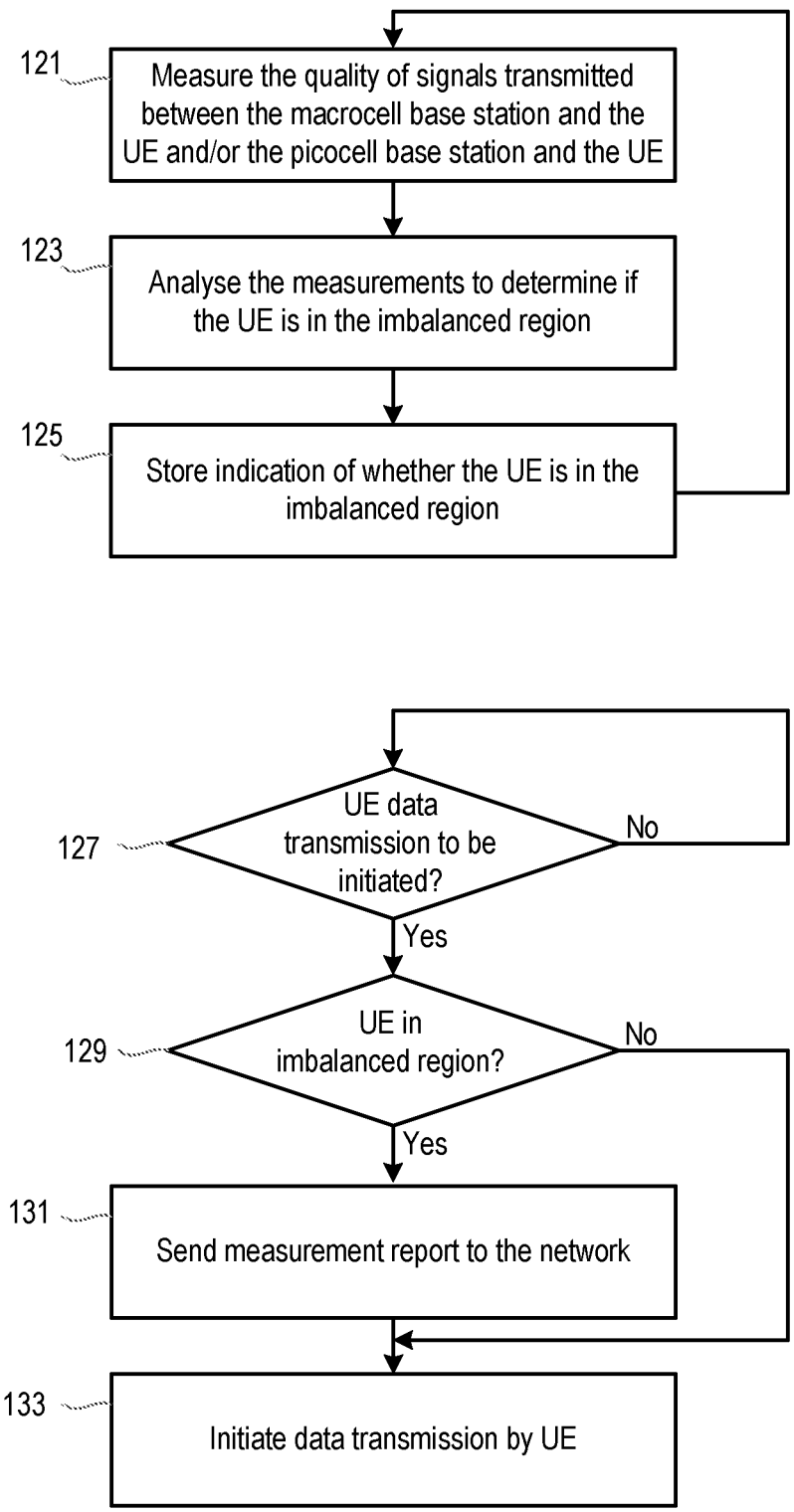
FIG. 8 is a flow chart illustrating a method of operating a user equipment according to a second specific embodiment.

A method of operating a UE 14 according to a second embodiment is shown in FIG. 8. In this embodiment, the operation of the UE 14 is shown as two processes, the first corresponding to steps 121-125 and the second corresponding to steps 127-133. These processes can operate generally simultaneously in the UE 14.

In step 121 of FIG. 8, the UE 14 measures the quality of signals transmitted between the UE 14 and one or more nearby base stations 4, 6. Step 121 can be implemented in the same way as step 101 of the first embodiment.

The signal quality measurements are then analysed in step 123 to determine if the UE 14 is in the specified region (i.e. the imbalanced region 16 or the range extension region). Again, this step can be implemented in the same way as step 103 above.

Then, in step 125, an indication of whether the UE 14 is in the specified region is stored in the memory module 36 of the UE 14. The method then returns to step 121 and repeats.

In the second process, beginning with step 127, it is determined whether a data transmission from the UE 14 is to be initiated. This data transmission may be the transmission of data by the UE 14 in a random access channel (RACH) or a transmission in response to a paging message sent to the UE 14 from the network 2. Step 127 repeats until there is data to be transmitted.

If a data transmission is to be initiated, the process moves to step 129 in which it is determined whether the UE 14 is in the specified region. In this step, the processing module 30 of the UE 14 can retrieve the indication stored in the memory module 36 in step 125 and determine from the indication if the UE 14 is in the specified region or not.

If the UE 14 is in the specified region, the process moves to step 131 in which the UE 14 sends a message to the network 2 to inform the network 2 that the UE 14 is in the specified region. This message can also indicate that the UE 14 is about to begin data transmission. As in the first embodiment, this message can be a measurement report that contains the signal quality measurements made by the UE 14 on the downlink signals from the picocell base station 4 and/or macrocell base station 6 (and optionally the signal quality measurements of any other nearby cells).

As described with reference to FIG. 9 below, a node in the network 2 (for example the picocell base station 4, macrocell base station 6 or RNC 8) can process the signal quality measurements in the measurement report to determine whether the UE 14 is in the imbalanced region 16 or range extension region.

In alternative implementations, the transmission of the message itself can indicate to the network 2 that the UE 14 is in the specified region—i.e. the UE 14 can be configured to only send the message when it is in the imbalanced region 16 or range extension region and it is about to initiate data transmission.

Once the message or measurement report has been transmitted to the network 2, the method moves to step 133 in which the UE 14 initiates the data transmission.

If in step 129 it is determined that the UE 14 is not in the specified region, the method can move directly to step 133 in which the UE 14 initiates the data transmission (i.e. no specific message or measurement report is transmitted by the UE 14 in this case).

It will be appreciated that steps 131 and 133 (the sending of the measurement report to the network and the initiation of the data transmission by the UE respectively) can occur in the order shown in FIG. 8, or they can occur at the same or substantially the same time, or even in the opposite order to that shown in FIG. 8.

Although this embodiment has a drawback in that it does not provide much, if any, time for the network 2 to implement a heterogeneous network solution before the UE 14 starts transmitting data, it does provide the advantage that there is little increase in the signalling overhead as messages or measurement reports are only sent when really needed. However, where the UE 14 is only transmitting relatively small and/or infrequent amounts of data (for example when the UE 14 is in the CELL_FACH state, the report can be sent with, just before or just after the first data transmission, which means that the network 2 can implement a heterogeneous network solution or technique in response to that report before any further data transmissions by the UE 14. For example, the inter-arrival time for uplink data relating to a web application in the UE 14 may be of the order of several seconds. The initial data transmission can be sent with the measurement report, and the network can initiate a communication improving technique to better serve the UE's subsequent data transmissions. One example of a suitable technique in this instance is soft handoff (SHO).

Given the advantages and drawbacks of each of the location-activated and traffic-activated triggers above (i.e. the methods in FIGS. 7 and 8 respectively) it will be appreciated that it is preferable to use traffic-activated triggers (the FIG. 8 embodiment) for UEs 14 that are in the CELL_FACH state (in which it is more important to maintain a low signalling overhead and therefore only transmit a traffic activated trigger after the UE PRACH ramps up for UL transmissions and/or upon responding to paging to the UE 14 for DL transmissions). For a UE 14 in the CELL_FACH state, it is not certain that there will be any data transmission while the UE is in the imbalanced region or range extension region. However, an exception could be for UEs 14 that are in the CELL_FACH state that have ongoing data transmissions. In this case, the use of location-activated triggers (FIG. 7) may be justified.

UEs 14 that are in the CELL_DCH state are largely synonymous with ongoing data transmissions (or imminent transmissions) and in this case it will be appreciated that it is preferred to use location-activated triggers (i.e. the FIG. 7 embodiment) to guarantee the best performance. The added overhead from the trigger event reports is insignificant in comparison to the relatively large payload data that is required to be transmitted and/or received by the UE 14 for it to be in the CELL_DCH state in the first place. If a UE 14 becomes active while inside the imbalanced region 16 or range extension region and it switches from the CELL_FACH state up to CELL_DCH state, traffic activated triggering can be used instead (since the 'UE entered imbalanced region' measurement report in step 107 of FIG. 7 will not be triggered). Alternatively, after switching from the CELL_FACH state up to the CELL_DCH state, the UE 14 can continue using the location-activated triggers (in which case the UE 14 will operate from step 109 in FIG. 7).

Thus, it will be appreciated that a UE 14 can be configured to operate according to just one or both of the methods described above. In the latter cases, the UE 14 can be configured to select the method to use based on the current radio resource control (RRC) state of the UE 14 (i.e. CELL_FACH or CELL_DCH).

Although in the embodiments described above the UE 14 preferably determines whether it is in the imbalanced or range extension regions on the basis of measurements of the downlink signal quality from the picocell base station 4 and macrocell base station 6, it will be appreciated that it is possible to determine whether the UE 14 is in the specified region based on measurements of the quality of the uplink from the UE 4 to the picocell base station 4 and macrocell base station 6. In this case, pathgain measurements of UL transmissions from the UE 14 (e.g. the dedicated physical control channel, DPCCH, from the UE 14) can be made at both the picocell base station 4 and macrocell base station 6. The pathgain measurements could then be communicated to the UE 14 so that the UE 14 can determine whether it is in the imbalanced region 16 or range extension region using similar relationships to those defined in equations (3) and (4). It will be appreciated that this approach requires coordination between the picocell base station 4 and macrocell base station 6 (including making the non-serving base station aware of the scrambling code used by the UE 14 so that the non-serving base station can despread the UL transmission (e.g. DPCCH)).

Figure 9:
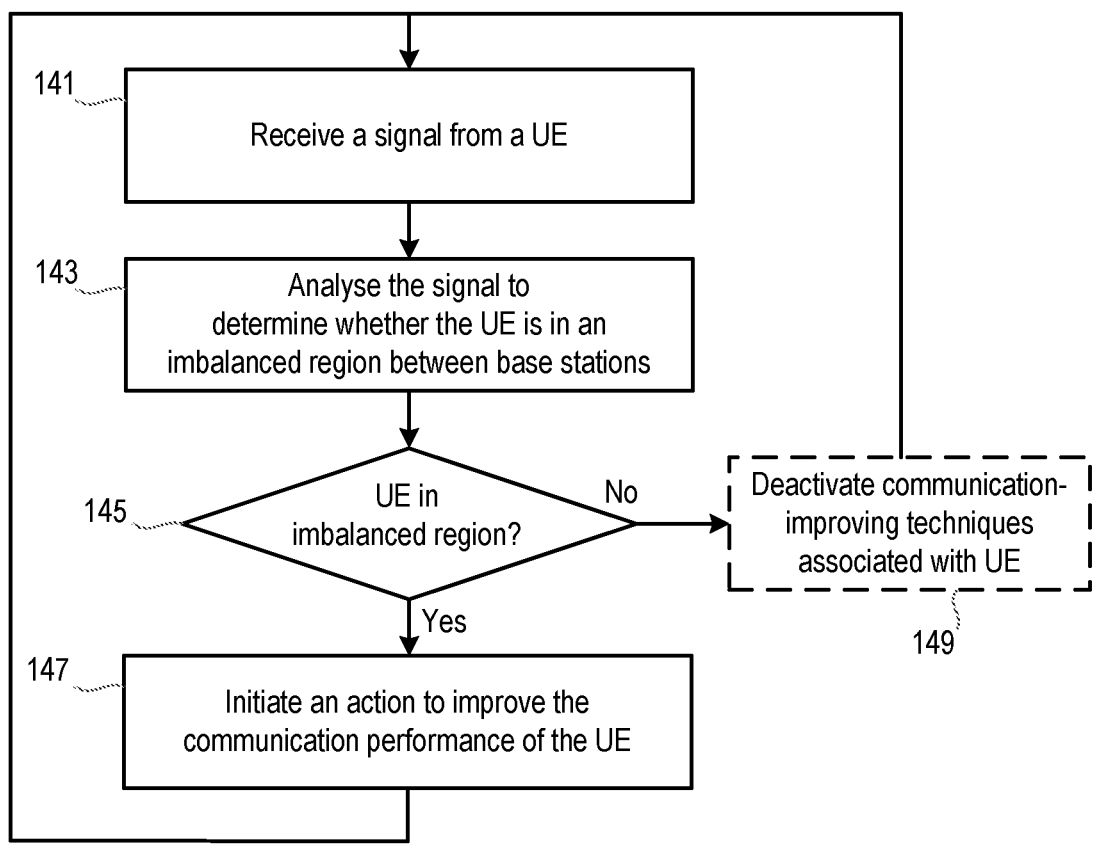
FIG. 9 is a flow chart illustrating a method of operating a node in the network.

FIG. 9 shows a method of operating a node in the network 2 according to the above embodiments. The node could be any one or more of the lower-power (picocell) base station 4, higher-power (macrocell) base station 6 or RNC 8.

In a first step, step 141, the node receives a signal, for example a measurement report or other message, from a UE 14. Where the node is a base station 4, 6, the signal will be received wirelessly from the UE 14 using antenna(s) 44 and transceiver module 42. Where the node is an RNC 8, the signal will be received wirelessly from the UE 14 at one of the base stations 4, 6 and passed by that base station 4, 6 to the RNC 8 through the Iub interface.

In steps 143 and 145, the node analyses the signal to determine whether the UE 14 is in a specified region (i.e. an imbalanced region or a range extension region) between the macrocell base station 6 and the picocell base station 4. The signal may comprise a measurement report or other message that has been transmitted by the UE 14 in accordance with the methods shown in FIGS. 7 and 8. In this case, the measurement report or message may comprise measurements of the quality of the downlink signals from the picocell base station 4 and/or macrocell base station 6 (or the measurements of pathgain G if calculated and/or used by the UE 14), so this step can comprise the node determining whether the UE 14 is in the imbalanced or range extension region using one of the relationships defined in equations (1)-(5). Alternatively, where the UE 14 is configured to only transmit a particular measurement report in a specific situation (e.g. when the UE 14 has entered the imbalanced region, left the imbalanced region 16 or is in the imbalanced region 16 and is about to (or just has) transmit data), step 143 can comprise the node determining the type of measurement report received from the UE 14.

Alternatively, rather than operate according to the methods in FIG. 7 or 8, the UE 14 can be configured by the node (e.g. RNC 8) to periodically send measurement reports to the RNC 8 corresponding to the received CPICH power (CPICH RSCP) or computed pathloss values for the serving and neighbouring cells. In this case, the RNC 8 can process the CPICH RSCP measurements in the measurement reports according to any of equations (1)-(4) to determine whether the UE 14 is located in the imbalanced region 16 or the range extension region. In the case of pathloss measurements, if the pathloss to the macrocell base station 6 is greater than to the picocell base station 4 and the UE 14 is being served by the macrocell base station 6, then the UE 14 is in the imbalanced region 16.

In an alternative implementation, rather than the UE 14 determining whether it is in the imbalanced region 16 or range extension region, the node can make the determination based on measurements of the quality of UL transmissions from the UE 14 (e.g. measurements, such as the pathgain, of the dedicated physical control channel, DPCCH, from the UE 14). Where the node is one of the picocell base station 4 or macrocell base station 6, the signal received in step 141 will be the UL transmission from the UE 14, and the base station will determine the pathgain from the received signal. The base station will also receive a signal from the other one of the picocell base station 4 and macrocell base station 6 indicating the signal quality (e.g. pathgain) of the UL transmission at that base station. Step 143 can then comprise the base station determining whether the UE 14 is in the imbalanced region 16 or range extension region from the UL quality measurements using similar relationships to those defined in equations (3) and (4). Alternatively, where the node is the RNC 8, the signal received in step 141 can be a signal from one or both of the picocell base station 4 or macrocell base station 6 indicating the measurements of the quality of the uplink from the UE 14 by those base stations. Step 143 can then comprise the RNC 8 determining whether the UE 14 is in the imbalanced region 16 or range extension region from those measurements using similar relationships to those defined in equations (3) and (4). It will be appreciated that these approaches require coordination between the picocell base station 4 and macrocell base station 6 to exchange the UL quality measurement and for the base station serving the UE 14 to make the non-serving base station aware of the scrambling code used by the UE 14 so that the non-serving base station can despread the UL transmission (e.g. DPCCH).

If the UE 14 is determined in step 143 to be in the imbalanced region 16 or range extension region, the method passes to step 147 in which the node initiates an action to improve the communication performance of the UE 14 while it is in the imbalanced region 16 or range extension region. The method then returns to step 141 where the node awaits another signal from the UE 14.

It will be appreciated that, where the UE 14 is in the CELL_FACH state (i.e. the UE 14 can send small amounts of data to the network 2) and the UE 14 has data to send to the network 2, the UE 14 can send a measurement report or other signal to the macrocell base station 6 along with the data If the UE 14 is not in the imbalanced region 16 or range extension region, the method returns to step 141 where the node awaits another signal from the UE 14. If an action or technique has previously been activated by the node or other part of the network 2 to improve the communication performance of the UE 14, then the method can proceed to step 141 via step 149 in which the active action or technique is deactivated. In this way, the action or technique will only be used while the UE 14 is in the most appropriate part of the network 2 (i.e. in the imbalanced region 16 or range extension region), and therefore not consume resources unnecessarily.

There is a further alternative implementation of step 143 in which the node determines whether the UE 14 is in the imbalanced region 16 or range extension region without requiring any specific action by the UE 14. In this alternative, both the macrocell base station 6 and picocell base station 4 listen for and record the time when the UE RACH ramps up (i.e. when they detect a RACH transmission from the UE). That is, when a UE 14 wants to initiate the transmission of data, it transmits a RACH preamble sequence, initially at a relatively low power. When the serving base station (e.g. the macrocell base station 6) receives the RACH preamble sequence, the serving cell responds with an acquisition indicator (AI) over an AICH (AI channel) which indicates the resources on the E-DCH to be used by the UE 14. If the UE 14 does not receive an AI in response to the transmission of a RACH preamble sequence, it retransmits the sequence at a higher power level. The UE 14 continues gradually increasing the power level of the transmitted RACH preamble sequence (called preamble ramping) until it receives a reply from the serving base station. In the imbalanced region 16, the pathloss to the picocell base station 4 will be less than the pathloss to the macrocell base station 6, so the picocell base station 4 should detect a RACH transmission from the UE 14 before the macrocell base station 6. Likewise, if the macrocell base station 6 hears the RACH transmission first, it is an indication that the UE 14 has left the imbalanced region 16. Thus, if the UE 14 has the macrocell as the serving cell but the picocell base station 4 hears the ramp up first (i.e. it detects a RACH preamble sequence transmitted at a lower power than the RACH preamble sequence detected by the macrocell base station 6), this is an indication to the network that the UE 14 is closer to the picocell base station 4 than to the macrocell base station 6 and is thus in the imbalanced region 16. To implement this embodiment, the non-serving base station can be informed of the set of RACH preamble sequences that are used by the serving base station, and the non-serving base station will be configured to perform RACH detection using these preamble sequences in addition to the regular RACH detection it does for UEs 14 associated with its own cell. This may require the non-serving base station to include components or other hardware in the form of correlators tuned to the serving cell preamble sequences. A low-latency connection between the base stations is also required so that the non-serving cell can signal to the serving cell when it hears the RACH ramp up.

There are therefore provided methods for determining when a UE 14 is located within the imbalanced region 16 (or a part of the imbalanced region 16) between two heterogeneous base stations 4, 6 in a network 2.

It will be appreciated that the base stations 4, 6, RNC 8 and/or UE 14 can be configured to implement the methods described above using suitable software or firmware, or by providing the base station 4, 6, RNC 8 and/or UE 14 with a suitably configured processor, processing module, application-specific integrated circuit (ASIC), field-programmable gate array (FPGA), etc.

In the following, different embodiments of the present disclosure are described.

Embodiments

1. A method of operating a mobile device in a heterogeneous communications network, the heterogeneous communications network comprising first and second base stations, the first base station having a lower transmission power than the second base station and being within the coverage area of the second base station, the method comprising:
   obtaining (91; 101; 121) measurements of the quality of signals transmitted between the first base station and the mobile device and/or the second base station and the mobile device; and
   analysing (93; 103; 123) the measurements of the quality to determine whether the mobile device is located in an imbalanced region or part of an imbalanced region between the first and second base stations.

2. A method as in embodiment 1, wherein, if following a determination that the mobile device is not located in the imbalanced region or the part of the imbalanced region, the mobile device is subsequently determined to be located in the imbalanced region or the part of the imbalanced region, the method further comprises the step of:
   transmitting (107; 131) a signal from the mobile device to at least one of the first and second base stations indicating that the mobile device has entered the imbalanced region or the part of the imbalanced region.

3. A method as in embodiment 1 or 2, wherein, if following a determination that the mobile device is located in the imbalanced region or the part of the imbalanced region, the mobile device is subsequently determined not to be located in the imbalanced region or the part of the imbalanced region, the method further comprises the step of:
   transmitting (115) a signal from the mobile device to at least one of the first and second base stations indicating that the mobile device is no longer in the imbalanced region or the part of the imbalanced region.

4. A method as in embodiment 1, 2 or 3, wherein the method further comprises the step of:
   in the event that it is determined (127, 129) in the step of analysing (123) that the mobile device is located in the imbalanced region or the part of the imbalanced region and data is to be transmitted by the mobile device, transmitting (131) a signal from the mobile device to at least one of the first and second base stations indicating that the mobile device is located in the imbalanced region or the part of the imbalanced region.

5. A method as in any of embodiments 2 to 4, wherein the signal transmitted by the mobile device to at least one of the first and second base stations comprises (i) a message indicating whether the mobile device is located in an imbalanced region or part of an imbalanced region between the first and second base stations; or (ii) a measurement report that comprises the obtained measurements of the quality of signals transmitted between the first base station and the mobile device and the second base station and the mobile device.

6. A method as in any preceding embodiment, wherein the step of obtaining (91; 101; 121) comprises measuring the quality of downlink signals from the first and second base stations to the mobile device, and wherein the step of analysing (93; 103; 123) comprises determining whether the mobile device is located in an imbalanced region where (i) the measured quality of downlink signals from the second base station is equal to or greater than the measured quality of downlink signals from the first base station, and (ii) the difference between the measured quality of downlink signals from the second base station and the measured quality of downlink signals from the first base station is equal to or less than the difference in the power at which the first and second base stations transmit signals in a control channel.

7. A method as in any of embodiments 1 to 5, wherein the step of obtaining (91; 101; 121) comprises measuring the quality of downlink signals from the first and second base stations to the mobile device and determining a pathgain from the mobile device to each base station, and wherein the step of analysing (93; 103; 123) comprises determining whether the mobile device is located in an imbalanced region where (i) the determined pathgain of uplink signals from the mobile device to the first base station is equal to or greater than the determined pathgain of uplink signals from the mobile device to the second base station, and (ii) the difference between the determined pathgain of uplink signals to the first base station and the determined pathgain of uplink signals to the second base station is equal to or less than the difference between the power at which the first and second base stations transmit signals in a control channel.

8. A method as in any of embodiments 1 to 5, wherein the step of obtaining (91; 101; 121) comprises measuring the quality of downlink signals from the first and second base stations to the mobile device, and wherein the step of analysing (93; 103; 123) comprises determining whether the mobile device is located in a part of the imbalanced region where (i) the measured quality of downlink signals from the second base station is equal to or greater than the measured quality of downlink signals from the first base station, and (ii) the difference between the measured quality of downlink signals from the second base station and the measured quality of downlink signals from the first base station is equal to or less than an offset value that is used to extend the range of the first base station.

9. A method as in any of embodiments 1 to 5, wherein the step of obtaining (91; 101; 121) comprises measuring the quality of downlink signals from the first and second base stations to the mobile device and determining a pathgain from the mobile device to each base station, and wherein the step of analysing (93; 103; 123) comprises determining whether the mobile device is located in a part of the imbalanced region where (i) the difference between the determined pathgain of uplink signals from the mobile device to the first base station and the determined pathgain of uplink signals from the mobile device to the second base station is equal to or less than the difference between the power at which the first and second base stations transmit signals in a control channel, and (ii) the difference between the determined pathgain of uplink signals to the first base station and the determined pathgain of uplink signals to the second base station is equal to or greater than an offset value that is used to extend the range of the first base station.

10. A method as in any of embodiments 1 to 5, wherein the step of obtaining (91; 101; 121) comprises measuring the quality of downlink signals from the first base station to the mobile device and wherein the step of analysing (93; 103; 123) comprises comparing the measured quality to upper and lower thresholds and determining that the mobile device is located in a part of the imbalanced region if the measured quality is below the upper threshold and above the lower threshold.

11. A mobile device (14) for use in a heterogeneous communications network (2), the heterogeneous communications network (2) comprising first and second base stations (4, 6), the first base station (4) having a lower transmission power than the second base station (6) and being within the coverage area of the second base station (6), the mobile device (14) comprising:
a processing module (30) configured to obtain measurements of the quality of signals transmitted between the first base station (4) and the mobile device (14) and/or the second base station (6) and the mobile device (14) and to analyse the measurements of the quality to determine whether the mobile device (14) is located in an imbalanced region (16) or part of an imbalanced region (16) between the first and second base stations (4, 6).

12. A mobile device (14) as in embodiment 11, wherein the processing module (30) is configured such that, following a determination by the processing module (30) that the mobile device (14) is not located in the imbalanced region (16) or the part of the imbalanced region (16) and a subsequent determination that the mobile device (14) is located in the imbalanced region (16) or the part of the imbalanced region (16), the processing module (30) initiates a transmission of a signal from the mobile device (14) to at least one of the first and second base stations (4, 6) indicating that the mobile device (14) has entered the imbalanced region (16) or the part of the imbalanced region (16).

13. A mobile device (14) as in embodiment 11 or 12, wherein the processing module (30) is configured such that, following a determination by the processing module (30) that the mobile device (14) is located in the imbalanced region (16) or the part of the imbalanced region (16) and a subsequent determination that the mobile device (14) is not located in the imbalanced region (16) or the part of the imbalanced region (16), the processing module (30) initiates a transmission of a signal from the mobile device (14) to at least one of the first and second base stations (4, 6) indicating that the mobile device (14) is no longer in the imbalanced region (16) or the part of the imbalanced region (16).

14. A mobile device (14) as in embodiment 11, 12 or 13, wherein the processing module (30) is configured such that, in the event that it is determined that the mobile device (14) is located in the imbalanced region (16) or the part of the imbalanced region (16) and data is to be transmitted by the mobile device (14), the processing module (30) initiates a transmission of a signal from the mobile device (14) to at least one of the first and second base stations (4, 6) indicating that the mobile device (14) is located in the imbalanced region (16) or the part of the imbalanced region (16).

15. A mobile device (14) as in any of embodiments 12 to 14, wherein the processing module (30) is configured to initiate transmission of a signal to at least one of the first and second base stations (4, 6) that comprises (i) a message indicating whether the mobile device (14) is located in an imbalanced region (16) or part of an imbalanced region (16) between the first and second base stations (4, 6); or (ii) a measurement report that comprises the obtained measurements of the quality of signals transmitted between the first base station (4) and the mobile device (14) and the second base station (6) and the mobile device (14).

16. A method of operating a node in a heterogeneous communications network, the heterogeneous communications network comprising first and second base stations, the first base station having a lower transmission power than the second base station and being within the coverage area of the second base station, the method comprising:
- receiving (95; 141) a signal from a mobile device in the network; and
- analysing (97; 143) the received signal to determine whether the mobile device is located in an imbalanced region or part of an imbalanced region between the first and second base stations.

17. A method as in embodiment 16, wherein the signal indicates one of (i) the mobile device has entered the imbalanced region or the part of the imbalanced region; (ii) the mobile device is no longer located in the imbalanced region or the part of the imbalanced region; or (iii) the mobile device is located in the imbalanced region or the part of the imbalanced region.

18. A method as in embodiment 16 or 17, wherein the received signal comprises a message that indicates measurements of the quality of signals transmitted between the first base station and the mobile device and/or the second base station and the mobile device; and wherein the step of analysing comprises analysing the measurements to determine whether the mobile device is located in the imbalanced region or the part of the imbalanced region between the first and second base stations.

19. A method as in embodiment 18, wherein the measurements of the quality of signals are measurements of the quality of downlink signals from the first and second base stations to the mobile device, and wherein the step of analysing (97; 143) comprises determining whether the mobile device is in an imbalanced region where (i) the measured quality of downlink signals from the second base station is equal to or greater than the measured quality of downlink signals from the first base station, and (ii) the difference between the measured quality of downlink signals from the second base station and the measured quality of downlink signals from the first base station is equal to or less than the difference in the downlink transmission power for the first and second base stations.

20. A method as in embodiment 18, wherein the measurements of the quality of signals are measurements of the quality of downlink signals from the first and second base stations to the mobile device or measurements of the pathgain from the mobile device to each base station derived from the measurements of the quality of the downlink signals, and wherein the step of analysing (97; 143) comprises determining whether the mobile device is in an imbalanced region where (i) the pathgain of uplink signals from the mobile device to the first base station is equal to or greater than the pathgain of uplink signals from the mobile device to the second base station, and (ii) the difference between the pathgain of uplink signals to the first base station and the pathgain of uplink signals to the second base station is equal to or less than the difference between the downlink transmission powers for the first and second base stations.

21. A method as in embodiment 18, wherein the measurements of the quality of signals are measurements of the quality of downlink signals from the first and second base stations to the mobile device, and wherein the step of analysing (97; 143) comprises determining whether the mobile device is in a part of the imbalanced region where (i) the measured quality of downlink signals from the second base station is equal to or greater than the measured quality of downlink signals from the first base station, and (ii) the difference between the measured quality of downlink signals from the second base station and the measured quality of downlink signals from the first base station is equal to or less than an offset value that is used to extend the range of the first base station.

22. A method as in embodiment 18, wherein the measurements of the quality of signals are measurements of the quality of downlink signals from the first and second base stations to the mobile device or measurements of the pathgain from the mobile device to each base station derived from the measurements of the quality of the downlink signals, and wherein the step of analysing (97; 143) comprises determining whether the mobile device is in a part of the imbalanced region where (i) the difference between the pathgain of uplink signals from the mobile device to the first base station and the pathgain of uplink signals from the mobile device to the second base station is equal to or less than the difference between the downlink transmission powers for the first and second base stations, and (ii) the difference between the pathgain of uplink signals to the first base station and the pathgain of uplink signals to the second base station is equal to or greater than an offset value that is used to extend the range of the first base station.

23. A method as in embodiment 18, wherein the measurements of the quality of signals are measurements of the quality of downlink signals from the first base station to the mobile device and wherein the step of analysing (97; 143) comprises comparing the measured quality to upper and lower thresholds, and determining that the mobile device is located in a part of the imbalanced region if the measured quality is below the upper threshold and above the lower threshold.

24. A method as in embodiment 16, wherein the signal is a signal sent in an uplink channel from the mobile device to one of the first and second base stations, the method further comprising the steps of:
- determining the quality of the uplink channel from the mobile device to the one of the first and second base stations from the received signal; and
- receiving a signal from the other one of said first and second base stations, the signal indicating the quality of the uplink channel from the mobile device to the other one of said first and second base stations;
- and wherein the step of analysing (97; 143) comprises analysing the quality of the uplink channels from the mobile device to the first and second base stations to determine whether the mobile device is located in an imbalanced region or part of an imbalanced region between the first and second base stations.

25. A method as in embodiment 24, wherein the step of analysing (97; 143) comprises determining whether the mobile device is located in an imbalanced region where (i) the quality of uplink signals from the mobile device to the first base station is equal to or greater than the quality of uplink signals from the mobile device to the second base station, and (ii) the difference between the quality of uplink signals to the first base station and the quality of uplink signals to the second base station is equal to or less than the difference between the power at which the first and second base stations transmit signals in a control channel.

26. A method as in embodiment 24, wherein the step of analysing (97; 143) comprises determining whether the mobile device is located in a part of the imbalanced region where (i) the difference between the quality of uplink signals from the mobile device to the first base station and the quality of uplink signals from the mobile device to the second base station is equal to or less than the difference between the power at which the first and second base stations transmit signals in a control channel, and (ii) the difference between the quality of uplink signals to the first base station and the quality of uplink signals to the second base station is equal to or greater than an offset value that is used to extend the range of the first base station.

27. A method as in embodiment 16, wherein the signal is a signal sent in an uplink channel from the mobile device to one of the first and second base stations that is the base station serving the mobile device, the method further comprising the steps of:
   determining the time of receipt of the signal in the uplink channel at the one of the first and second base stations that is the base station serving the mobile device; and
   receiving a signal from the other one of said first and second base stations, the signal indicating the time of receipt of the signal in the uplink channel at the other one of said first and second base stations;
   and wherein the step of analysing (97; 143) comprises comparing the determined time of receipt and the received time of receipt to determine whether the mobile device is located in an imbalanced region between the first and second base stations.

28. A method as in embodiment 27, wherein the step of analysing (97; 143) comprises determining that the mobile device is located in the imbalanced region when the mobile device is being served by the second base station and the time of receipt of the signal in the uplink channel at the first base station is before the time of receipt of the signal in the uplink channel at the second base station.

29. A method as in any of embodiments 16 to 28, wherein the method further comprises the step of:
   in the event that it is determined in the step of analysing (97; 143) that the mobile device has entered or is located in the imbalanced region or the part of the imbalanced region, initiating (147) an action to improve the communication performance of the mobile device with the network.

30. A method as in any of embodiments 16 to 28, wherein the method further comprises the step of:
   in the event that it is determined in the step of analysing (97; 143) that the mobile device is located in the imbalanced region or the part of the imbalanced region and data is to be transmitted by the mobile device, initiating (147) an action to improve the communication performance of the mobile device with the network.

31. A node (4; 6; 8) for use in a heterogeneous communications network (2), the heterogeneous communications network (2) comprising first and second base stations (4, 6), the first base station (4) having a lower transmission power than the second base station (6) and being within the coverage area of the second base station (6), the node (4; 6; 8) comprising:
   a transceiver module (42; 52) configured to receive a signal from a mobile device (14) in the network (2); and
   a processing module (40; 50) configured to analyse the received signal to determine whether the mobile device (14) is located in an imbalanced region (16) or part of an imbalanced region (16) between the first and second base stations (4, 6).

32. A node (4; 6; 8) as in embodiment 31, wherein the processing module (40; 50) is further configured to initiate an action to improve the communication performance of the mobile device (14) with the network (2) in the event that it is determined that the mobile device (14) has entered or is located in the imbalanced region (16) or the part of the imbalanced region (16).

33. A node (4; 6; 8) as in embodiment 31, wherein the processing module (40; 50) is further configured to initiate an action to improve the communication performance of the mobile device (14) with the network (2) in the event that it is determined that the mobile device (14) is located in the imbalanced region (16) or the part of the imbalanced region (16) and data is to be transmitted by the mobile device (14).

34. A node (4; 6; 8) as in any of embodiments 31 to 33, wherein the node is one of the first base station, second base station or a radio network controller associated with one or both of the first base station and the second base station.

35. A computer program product comprising computer readable code embodied therein, the computer readable code being configured such that, on execution by a suitable computer or processor, the computer or processor is configured to perform the method defined in any of embodiments 1-10 or 16-30.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method of operating a mobile device in a heterogeneous communications network, the heterogeneous communications network comprising a first base station and a second base station, the first base station having a lower transmission power than the second base station and being within the coverage area of the second base station, the method comprising:
   obtaining, at the mobile device, a first transmission power for the first base station and measurements of the quality of signals transmitted between the first base station and the mobile device, wherein the measurements of the quality of signals transmitted between the first base station and the mobile device comprises a first cell downlink (DL) quality measurements; and
   obtaining, at the mobile device, a second transmission power for the second base station and measurements of the quality of signals transmitted between the second base station and the mobile device, wherein the measurements of the quality of signals transmitted between the second base station and the mobile device comprises a second cell DL quality measurement;
   analyzing, by the mobile device, the measurements of the quality to determine whether the mobile device is located in an imbalanced region between the first base station and the second base station, wherein analyzing the measurements of the quality of signals comprises:
      determining a DL quality measurement difference between the second DL quality measurement and the first DL quality measurement;
      determining a transmission power difference between the first transmission power and the second transmission power;
      comparing the DL quality measurement difference to the transmission power difference; and
      determining the mobile device is within the imbalanced region when the DL quality measurement difference is less or equal to the transmission power difference and greater than zero; and
   transmitting, by the mobile device, a signal from the mobile device to at least one of the first base station and the second base station in response to the determination of whether the mobile device is located in the imbalanced region.

2. The method of claim 1, wherein transmitting, by the mobile device, the signal from the mobile device to at least one of the first base station and the second base station indicates that the mobile device has entered the imbalanced region when the mobile device is determined to be located in the imbalanced region following a determination that the mobile device is not located in the imbalanced region.

3. The method of claim 1, wherein transmitting, by the mobile device, the signal from the mobile device to at least one of the first base station and the second base station indicates that the mobile device is no longer in the imbalanced region when the mobile device is determined to be located in the imbalanced region and subsequently is determined to no longer be in the imbalanced region.

4. The method of claim 1, further comprising: determining data is to be transmitted to the mobile device when the mobile device is located in the imbalanced region; and
wherein transmitting the signal from the mobile device to at least one of the first base station and the second base station indicates that the mobile device is located in the imbalanced region.

5. The method of claim 2, wherein the signal transmitted by the mobile device to at least one of the first base station and the second base station comprises a message indicating whether the mobile device is located in the imbalanced region or a measurement report that comprises the first cell DL quality measurements and the second cell DL quality measurements.

6. The method of claim 1, wherein analyzing the measurement of quality comprises determining whether the mobile device is located in an imbalanced region where the measured quality of downlink signals from the second base station is equal to or greater than the measured quality of downlink signals from the first base station, and the difference between the measured quality of downlink signals from the second base station and the measured quality of downlink signals from the first base station is equal to or less than the difference in the power at which the first base station and the second base station transmit signals in a control channel.

7. A mobile device for use in a heterogeneous communications network, the heterogeneous communications network comprising a first base station and a second base station, the first base station having a lower transmission power than the second base station and being within the coverage area of the second base station, the mobile device comprising:
a processor configured to:
obtain a first transmission power for the first base station and measurements of the quality of signals transmitted between the first base station and the mobile device, wherein the measurements of the quality of signals transmitted between the first base station and the mobile device comprises a first cell downlink (DL) quality measurements;
obtain a second transmission power from the second base station and measurements of the quality of signals transmitted between the second base station and the mobile device, wherein the measurements of the quality of signals transmitted between the second base station and the mobile device comprises a second cell DL quality measurement;
analyze the measurements of the quality to determine whether the mobile device is located in an imbalanced region between the first base station and the second base station, wherein analyzing the measurements of the quality of signals comprises:
determining a DL quality measurement difference between the second DL quality measurement and the first DL quality measurement;
determining a transmission power difference between the first transmission power and the second transmission power;
comparing the DL quality measurement difference to the transmission power difference; and
determining the mobile device within the imbalanced region when the DL quality measurement difference is less or equal to the transmission power difference and greater than zero; and
initiate a transmission of a signal to at least one of the first base station and the second base station in response to the determination of whether the mobile device is located in the imbalanced region.

8. The mobile device of claim 7, wherein initiating the transmission of the signal from the mobile device to at least one of the first base station and the second base station indicates that the mobile device has entered the imbalanced region when the mobile device is determined to be located in the imbalanced region following a determination that the mobile device is not located in the imbalanced region.

9. The mobile device of claim 7, wherein initiating the transmission of the signal from the mobile device to at least one of the first base station and the second base station indicates that the mobile device is no longer in the imbalanced region when the mobile device is determined to be located in the imbalanced region and subsequently is determined to no longer be in the imbalanced region.

10. The mobile device of claim 7, wherein the processor is configured to:
determine data is to be transmitted by the mobile device; and
wherein initiating the transmission of the signal from the mobile device to at least one of the first base station and the second base station indicates that the mobile device is located in the imbalanced region.

11. The mobile device of claim 8, wherein the transmission of the signal to at least one of the first base station and the second base station comprises a message indicating whether the mobile device is located in an imbalanced region; or a measurement report that comprises the first cell DL quality measurements and the second cell DL quality measurements.

12. A method of operating a node in a heterogeneous communications network, the heterogeneous communications network comprising a first base station and a second base station, the first base station having a lower transmission power than the second base station and being within the coverage area of the second base station, the method comprising:
receiving a first transmission power for the first base station;
receiving a second transmission power for the second base station;
receiving quality measurements comprising:
a first cell downlink (DL) quality measurement of the quality of signals transmitted between the first base station and a mobile device; and a second cell DL quality measurement of the quality of signals between the second base station and the mobile device;

determining a DL quality measurement difference between the second DL quality measurement and the first DL quality measurement;

determining a transmission power difference between the first transmission power and the second transmission power;

comparing the DL quality measurement difference to the transmission power difference;

determining the mobile device is within the imbalanced region when the DL quality measurements is less or equal than the transmission power difference and greater than zero; and transmitting a signal to at least one of the first base station and the second base station in response to the determination of whether the mobile device is located in the imbalanced region.

13. The method of claim 12, wherein comparing the DL quality measurement difference to the transmission power difference indicates one of the mobile device has entered the imbalanced region; the mobile device is no longer located in the imbalanced region; or the mobile device is located in the imbalanced region.

14. The method of claim 12, wherein the mobile device is in an imbalanced region when the second cell DL quality measurement is equal to or greater than the first cell DL quality measurement, and the DL quality measurement difference is equal to or less than the transmission power difference.

15. A node in a heterogeneous communications network, the heterogeneous communications network comprising a first base station and a second base station, the first base station having a lower transmission power than the second base station and being within the coverage area of the second base station, the node comprising:

a transceiver configured to receive:
  a first transmission power for the first base station;
  a second transmission power for the second base station; and
  quality measurements comprising:
    a first cell downlink (DL) quality measurement of the quality of signals transmitted between the first base station and a mobile device; and
    a second cell DL quality measurement of the quality of signals between the second base station and the mobile device;

a processor operably coupled to the transceiver and configured to:
  determine a DL quality measurement difference between the second DL quality measurement and the first DL quality measurement;
  determine a transmission power difference between the first transmission power and the second transmission power;
  compare the DL quality measurement difference to the power difference;
  determine the mobile device is within the imbalanced region when the DL quality measurement is less or equal than the transmission power difference and greater than zero; and
  transmit a signal to at least one of the first base station and the second base station in response to the determination of whether the mobile device is located in the imbalanced region.

16. The node of claim 15, wherein the processing module is further configured to initiate an action to improve the communication performance of the mobile device with the network in the event that it is determined that the mobile device has entered or is located in the imbalanced region.

17. The node of claim 15, wherein the processing module is further configured to initiate an action to improve the communication performance of the mobile device with the network in the event that it is determined that the mobile device is located in the imbalanced region and data is to be transmitted by the mobile device.

* * * * *